United States Patent
Brazier et al.

(10) Patent No.: US 10,399,618 B2
(45) Date of Patent: Sep. 3, 2019

(54) TRACK ASSEMBLY FOR A VEHICLE

(71) Applicant: Altoz, Inc., Greenbush, MN (US)

(72) Inventors: Dennis Brazier, Greenbush, MN (US); Mark Reese, Roseau, MN (US)

(73) Assignee: ALTOZ, INC., Greenbush, MN (US)

( * ) Notice: Subject to any disclaimer, the term of this patent is extended or adjusted under 35 U.S.C. 154(b) by 71 days.

(21) Appl. No.: 15/415,802

(22) Filed: Jan. 25, 2017

(65) Prior Publication Data

US 2018/0208256 A1    Jul. 26, 2018

(51) Int. Cl.
*B62D 55/04* (2006.01)
*B62D 55/02* (2006.01)
*B62D 55/10* (2006.01)
*A01D 101/00* (2006.01)
*B62D 55/108* (2006.01)

(52) U.S. Cl.
CPC .......... *B62D 55/04* (2013.01); *B62D 55/02* (2013.01); *B62D 55/10* (2013.01); *A01D 2101/00* (2013.01); *B62D 55/1083* (2013.01)

(58) Field of Classification Search
CPC .................................................... B62D 55/04
See application file for complete search history.

(56) References Cited

U.S. PATENT DOCUMENTS

| | | | |
|---|---|---|---|
| 1,238,762 A * | 9/1917 | Hapeman | B62D 55/04 180/185 |
| 3,756,334 A * | 9/1973 | Williams | B62M 27/02 180/192 |
| 3,937,288 A | 2/1976 | Kehler | |
| 5,607,210 A * | 3/1997 | Brazier | B62D 55/04 305/131 |
| 6,076,619 A | 6/2000 | Hammer | |

(Continued)

FOREIGN PATENT DOCUMENTS

| EP | 2360085 A1 * | 8/2011 | ............ B62D 55/04 |
| EP | 2327610 B1 | 1/2012 | |

OTHER PUBLICATIONS

UkEB3ar1. "John Deere Zero Turn With Tracks," YouTube, Retrieved from https://www.youtube.com/watch?v=mxT2CUN4IAU. Published on Oct. 13, 2014.

(Continued)

*Primary Examiner* — Kevin Hurley
(74) *Attorney, Agent, or Firm* — Lowe Graham Jones PLLC

(57) ABSTRACT

A mower includes a pair of track assemblies positioned on either side of a chassis. The track assemblies include drive wheels coupled to axles driven by an engine. A rocker rigidly mounts to the chassis independently of the engagement of the drive wheel with the axle. The rocker rotatably mounts to a mounting flange fastened to the chassis and includes a plurality of axles to which bogie wheels are mounted. The rocker is vertically below the axle and may be longitudinally centered on the axle or may be asymmetric with respect to the axle. All weight transferred is transferred to a track surrounding the drive wheel and bogie wheels through the rocker assembly engaging the chassis and no weight is transferred to the axle. A suspension may mount the track assembly to the chassis and the track may be long enough to replace front and back wheels.

19 Claims, 11 Drawing Sheets

(56) References Cited

U.S. PATENT DOCUMENTS

| | | | |
|---|---|---|---|
| 6,199,646 B1 * | 3/2001 | Tani | B62D 55/04 |
| | | | 180/9.21 |
| 6,547,345 B2 | 4/2003 | Phely | |
| 6,615,939 B1 | 9/2003 | Karales et al. | |
| 6,890,042 B2 * | 5/2005 | Inaoka | B62D 55/244 |
| | | | 180/9 |
| 7,040,426 B1 | 5/2006 | Berg | |
| 7,328,529 B2 | 2/2008 | Bergsten | |
| 7,328,760 B2 * | 2/2008 | Inaoka | B62D 49/0635 |
| | | | 180/9.21 |
| 8,146,689 B2 | 4/2012 | Hertema | |
| 8,607,904 B2 | 12/2013 | Fukumoto et al. | |
| 9,302,721 B1 | 4/2016 | Johnstone | |
| 9,308,951 B2 * | 4/2016 | Pare | B62D 55/14 |
| 9,586,634 B2 * | 3/2017 | Buchanan | B62D 55/08 |
| 9,988,108 B2 * | 6/2018 | Tratta | A01D 75/28 |
| 2002/0175007 A1 | 11/2002 | Strong | |
| 2004/0244349 A1 * | 12/2004 | Meier | A01D 69/00 |
| | | | 56/17.5 |
| 2014/0069730 A1 * | 3/2014 | Lafreniere | B62D 55/084 |
| | | | 180/9.21 |
| 2014/0231157 A1 | 8/2014 | Green | |
| 2015/0078871 A1 | 3/2015 | Eavenson, Sr. et al. | |
| 2018/0009490 A1 * | 1/2018 | Sauvageau | B62D 55/08 |
| 2018/0037278 A1 * | 2/2018 | Cox | B62D 55/04 |

OTHER PUBLICATIONS

RemoteMowersCom. "2013 TRX-42 Hydro-Static R/C Replaces Zero-Turn Riding Lawn Mowers on Steep Hills." YouTube. Retrieved from https://www.youtube.com/watch?v=aSeTIOwVZfw. Published on Dec. 16, 2012.

* cited by examiner

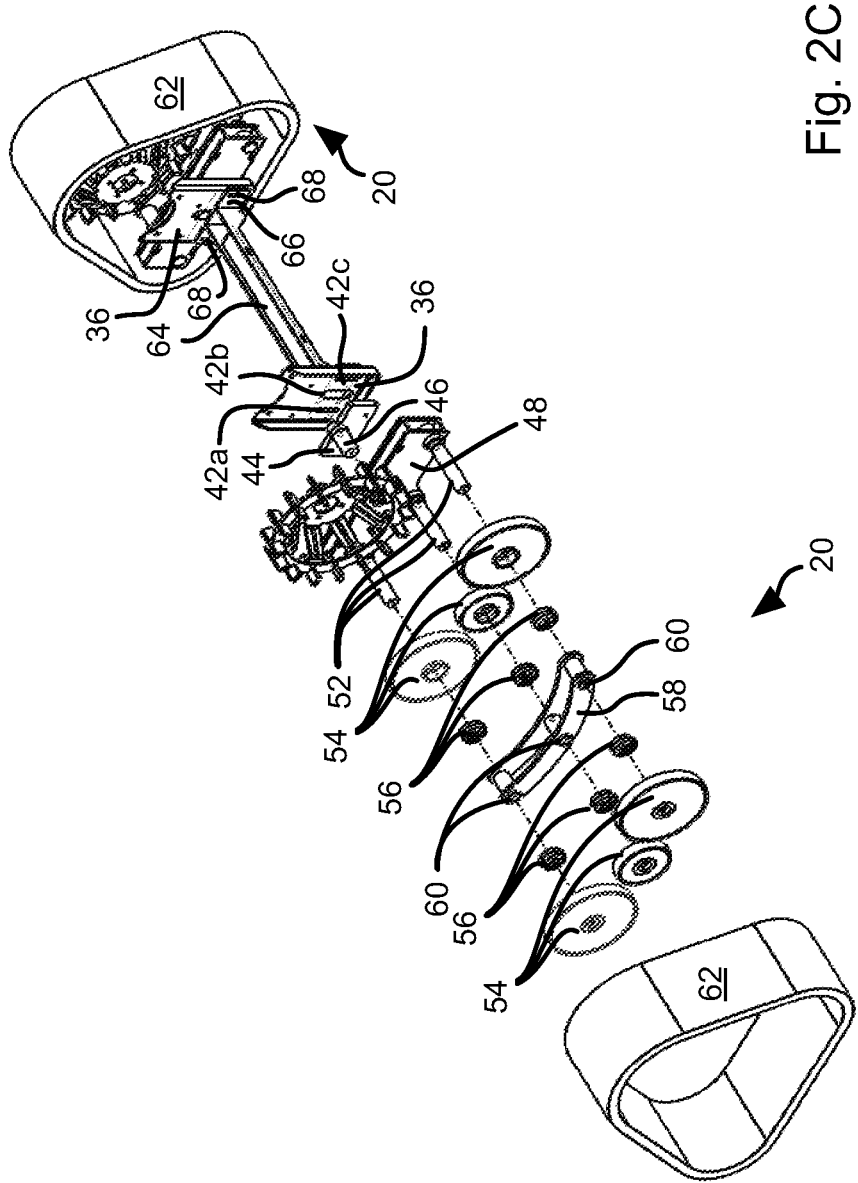

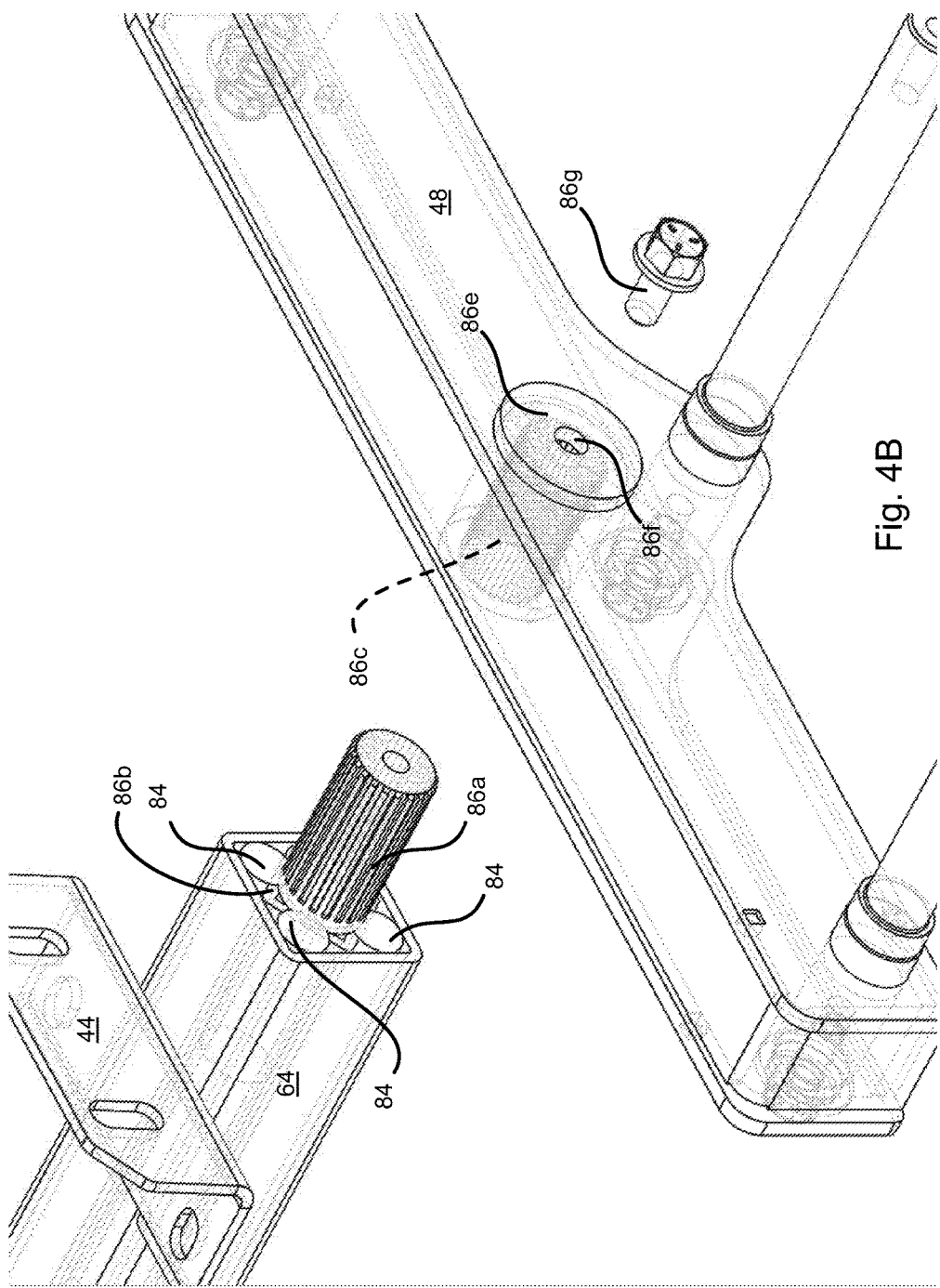

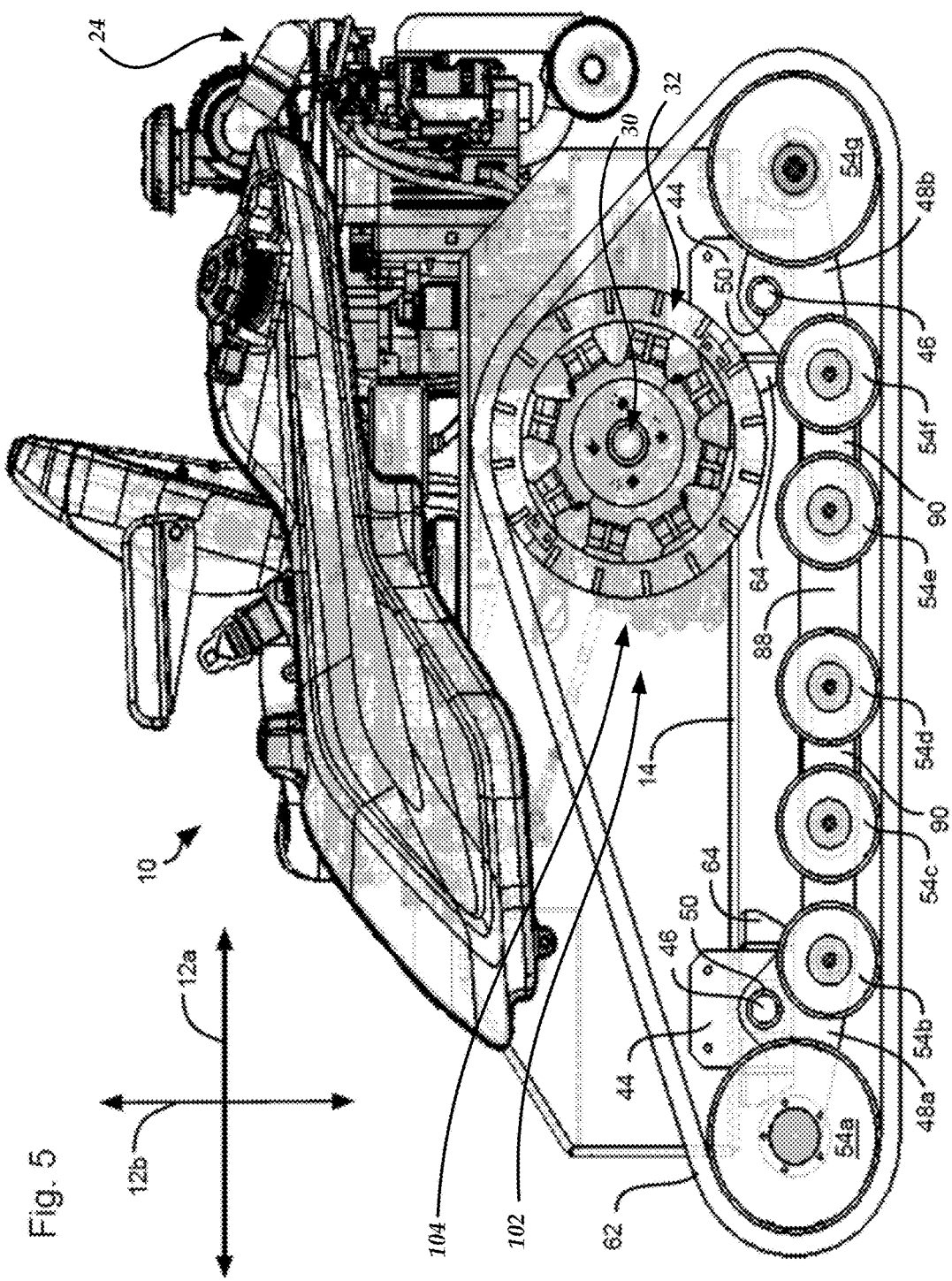

10,399,618 B2

TRACK ASSEMBLY FOR A VEHICLE

FIELD OF THE INVENTION

This application relates to track assemblies for vehicles, such as mowers and to track assemblies to replace wheels on a vehicle.

BACKGROUND OF THE INVENTION

Tracks, such as are found on tanks, snowmobiles, and heavy construction equipment, provide increased surface area in contact with the ground. This results in increased traction, less damage to surfaces being driven over, and less sinking in soft ground. Recently, adapters have been developed that secure to a vehicle in the place of a wheel in order to convert the vehicle to a tracked vehicle, thereby providing the benefits of a track where needed or desired.

The systems and methods disclosed herein provide an improved approach for mounting tracks to a vehicle such as a zero-turn mower.

SUMMARY OF THE INVENTION

In one aspect of the invention, a vehicle includes a chassis, an engine mounted to the chassis, and track assemblies positioned on either side of the chassis. Each track assembly includes an axle rotatably mounted to the chassis and operatively coupled to the engine and a drive wheel mounted to the axle. A bogie wheel assembly is mounted to the chassis independently of the axle and a track is wrapped around the drive wheel and bogie wheel assembly. The bogie wheel assembly supports all weight applied to the track such that no weight of the vehicle is supported by engagement of the drive wheel with the axle.

In some embodiments, the bogie wheel assembly is located vertically below the axle. The bogie wheel assembly may be rigidly coupled to the chassis without any intervening suspension component. A bar may be positioned below the chassis and rigidly couple the track assemblies to one another.

In some embodiments, the bogie wheel assembly includes a rocker having a plurality of bogie wheels rotatably mounted thereto, the rocker being rotatably mounted to the chassis without any intervening suspension component. In other embodiments, suspension members are used to bias the pivoting of the rocker. Torsional biasing may be employed at the pivot.

In some embodiments, the plurality of bogie wheels is symmetrically arranged with respect to the axle. In other embodiments, a rearward-most bogie wheel of the plurality of bogie wheels is positioned farther from the axle than a forward-most bogie wheel of the plurality of bogie wheels.

In some embodiments, a mower deck is mounted to the chassis forward of the track assemblies and two or more wheels, such as caster wheels, are mounted to the chassis having the mower deck positioned between the track assemblies and the wheels. In other embodiments, casters are not used or removable casters are used.

In some embodiments, a transmission coupling the engine to the axles implements a zero-turn-radius drive system.

In some embodiments, the vehicle includes a driveline. The drive wheel may be mounted to the driveline. In some embodiments, the bogie wheel assembly is decoupled from the driveline and is mounted to the chassis independently of the driveline. The bogie wheel assembly may support all weight applied to the track such that vertical force applied to the bogie wheel assembly is transferred to the chassis through the bogie wheel assembly and entirely bypasses the driveline en route to the chassis. In some embodiments, the bogie wheel assembly is pivotally coupled to a fixed member of the chassis. The track assemblies may each further include a mounting plate fastened to the chassis. In some embodiments, the vehicle further includes a bar positioned below the chassis and rigidly coupling the mounting plates to one another. The vehicle may further include a transmission coupling the engine to the axles of the track assemblies. In some examples, the transmission implements a zero-turn radius drive system.

A corresponding method of use is also disclosed and claimed.

BRIEF DESCRIPTION OF THE DRAWINGS

Preferred and alternative examples of the present invention are described in detail below with reference to the following drawings:

FIGS. 2A to 2C are exploded views of the track assembly in accordance with embodiments of the present invention;

FIG. 4B is an isometric view of a portion of the track assembly with an adjustable attachment;

FIG. 5 is a side-elevational view of a mower incorporating an alternative embodiment of a track assembly replacing both front and rear wheels in accordance with an embodiment of the present invention

DETAILED DESCRIPTION OF THE PREFERRED EMBODIMENTS

Figure 1A:
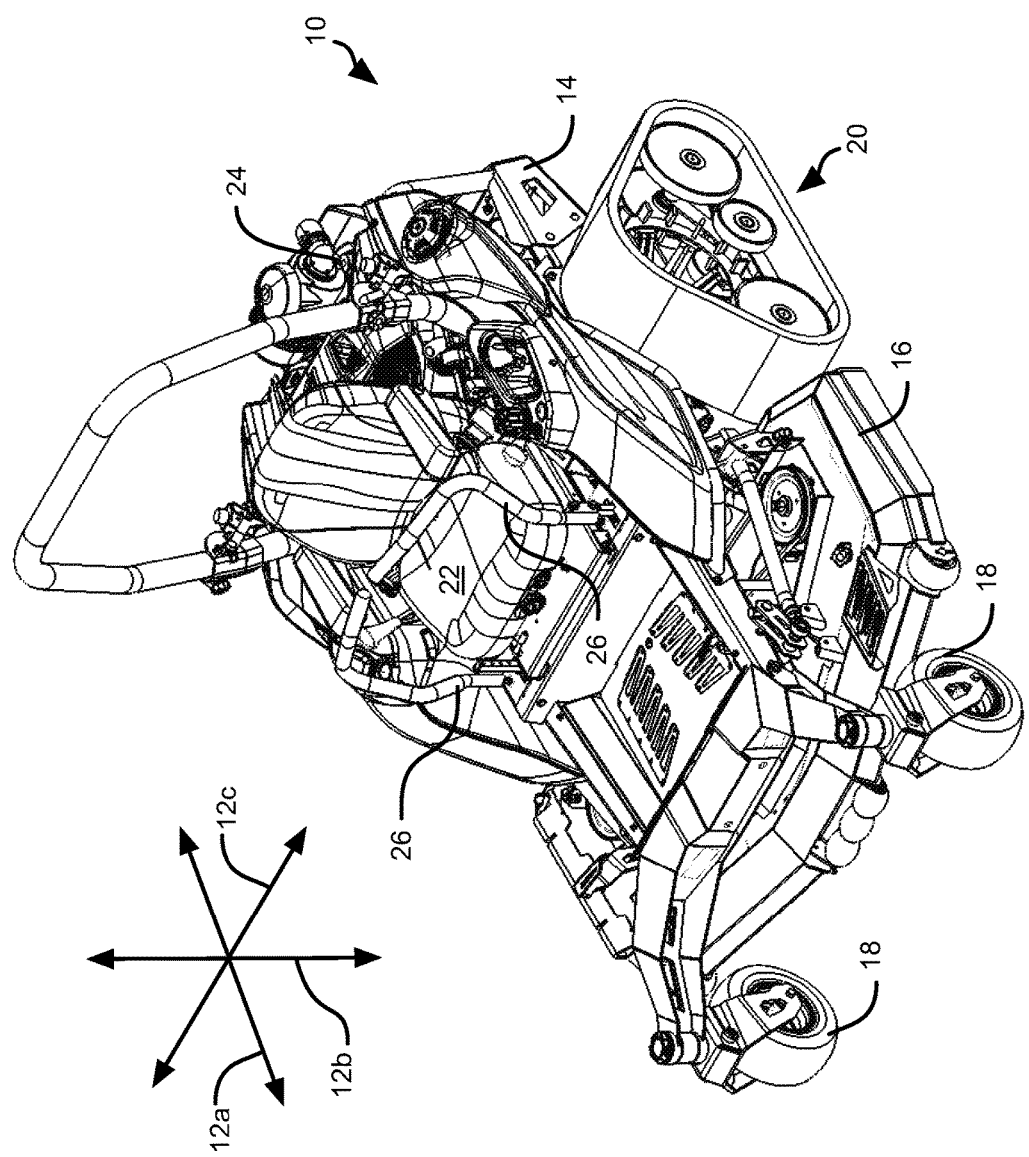
FIG. 1A is an isometric view of a mower incorporating a track assembly in accordance with an embodiment of the present invention.
Figure 1B:
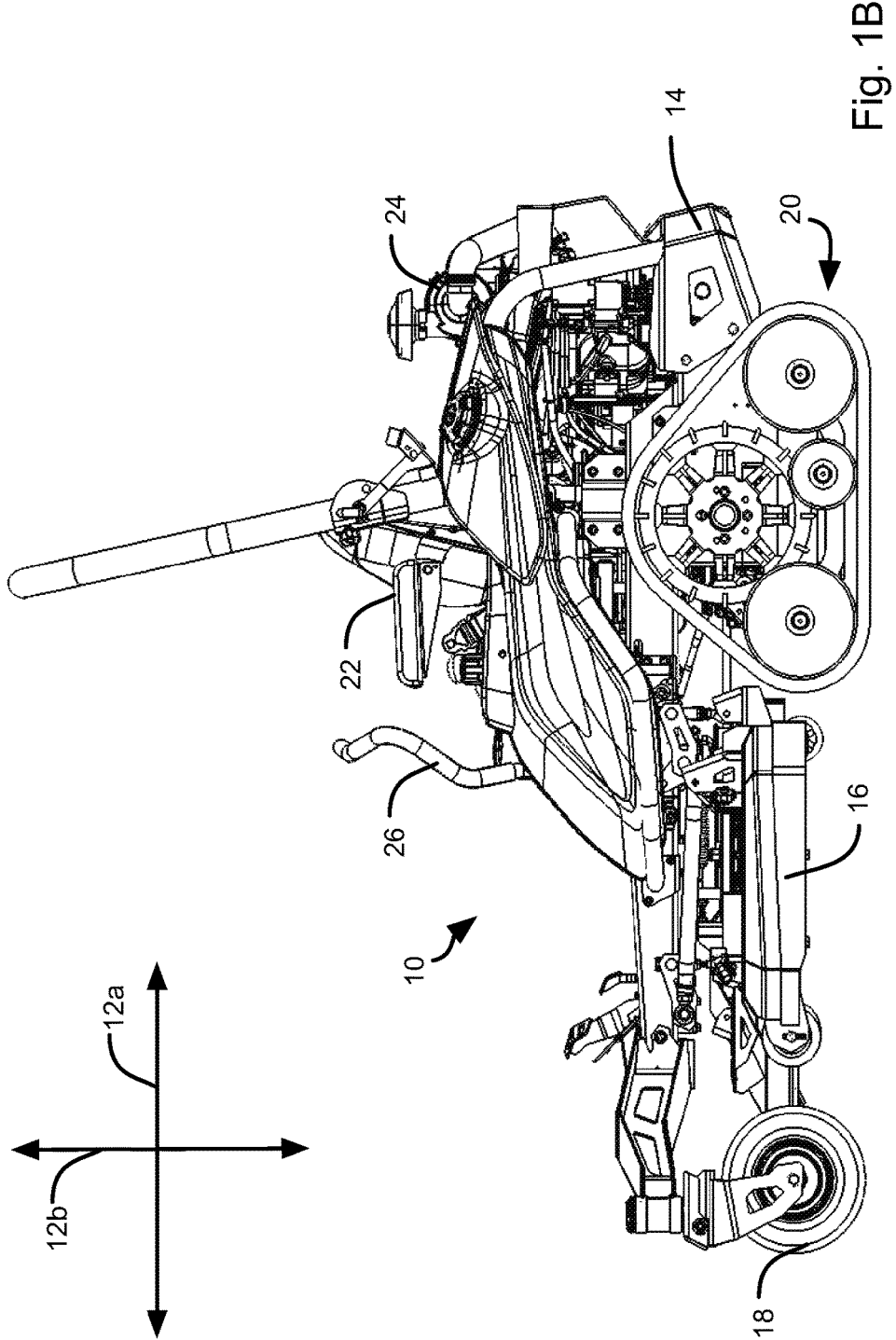
FIG. 1B is a side-elevational view of the mower incorporating the track assembly in accordance with an embodiment of the present invention.

Referring to FIGS. 1A and 1B, a mower 10 according to the embodiments disclosed herein may be understood with respect to a longitudinal direction 12a, a vertical direction 12b, and a horizontal direction 12c that are all mutually orthogonal.

The mower 10 includes a chassis 14 having a mower deck 16 mounted thereto. In some embodiments, the chassis 14 may further have caster wheels 18 mounted to the chassis forward of the mower deck 16 along the longitudinal direction 12a. Rearward of the mower deck 16 along the longitudinal direction 12a, track assemblies 20 mount on either side of the chassis 14.

In the illustrated embodiment, the mower 10 is a zero-turn-radius mower that includes a seat 22 positioned between the track assemblies 20 and forward of an engine 24. As known in the art, the driver controls the speed and direction of the mower 10 by means of handles 26 that independently control the torque applied to each track assembly 20. For example, in some embodiments, the engine 24 drives a hydraulic pump with the handles 26 controlling the flow of hydraulic fluid to hydraulic motors coupled to each track assembly 20. Single or dual handles 26 (or "joysticks") may be used according to known methods. Any other torque-transfer system known in the art may be used to provide independent control of the torque applied to each track assembly 20.

Figure 2A:
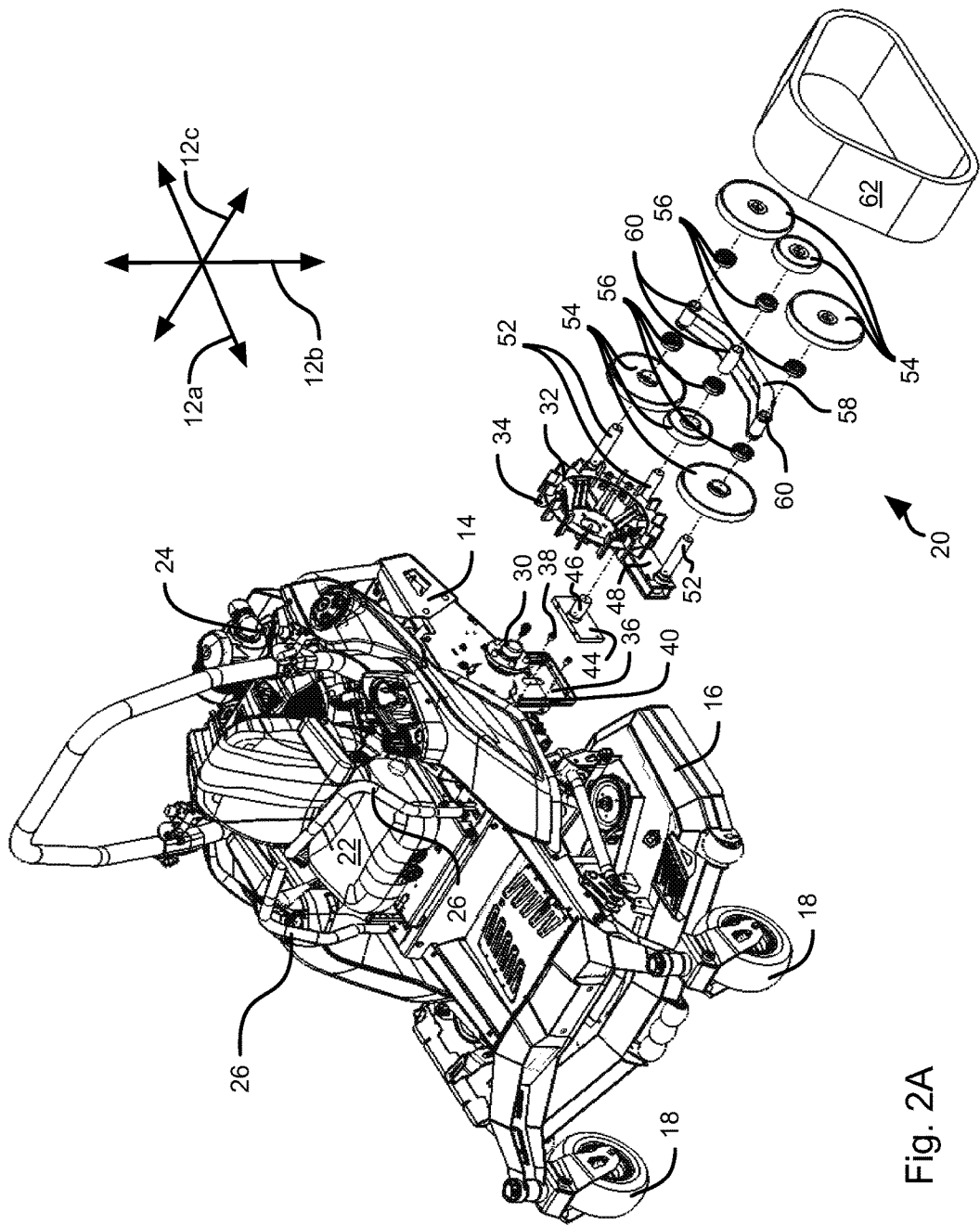
Figure 2B:
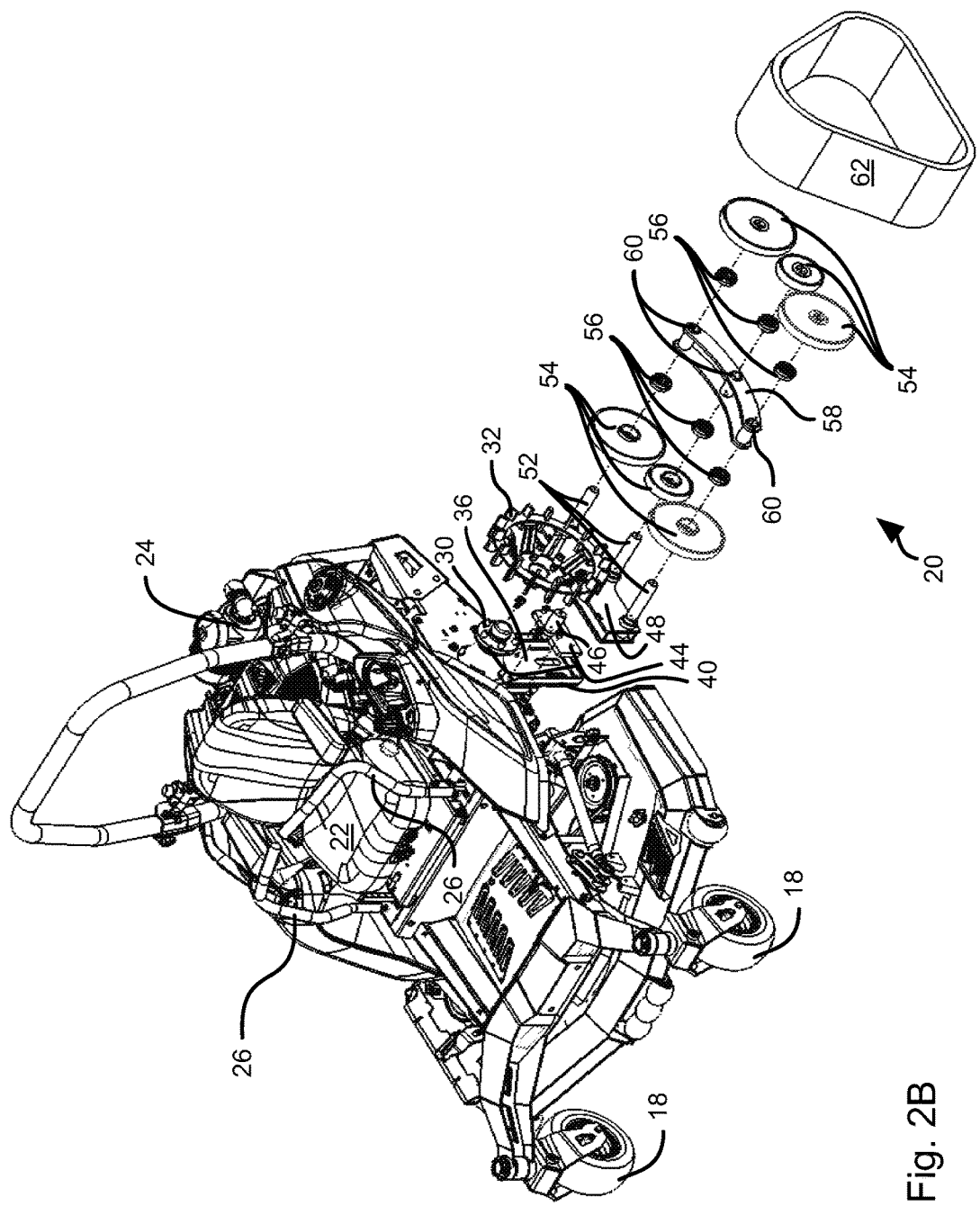

Referring to FIGS. 2A to 2C, an axle 30 protrudes on each side of the chassis 14. The axles 30 are driven by the engine, such as by means of hydraulic motors, a transmission, or other torque transfer system. Each track assembly 20 includes a drive wheel 32 that is fastened to the axle 30. As shown, the drive wheel 32 may include teeth 34 that engage corresponding lugs on a track in order to transfer torque to the track. The configuration of the teeth 34 and corresponding lugs or other features of the track engaged by the teeth may be according to any approach known in the art for implementing a track system.

A mounting flange 36 extends from the chassis 14 below the axle 30 along the vertical direction 12b. The mounting flange 36 may also be centered on the axle 30 along the longitudinal direction 12a. The mounting flange 36 may be a monolithic part of a member of the chassis 14 or may fasten to the chassis 14 by means of bolts 38, welds, or another fastening mechanism.

In the illustrated embodiment, the mounting flange 36 defines a rim protruding outwardly from the chassis 14 along the horizontal direction 14c. The mounting flange 36 further defines one or more slots 42a, 42b, 42c (best seen in FIG. 2C) having a long dimension thereof aligned with the vertical direction 12b. As shown, the slots 42a-42c include a wider slot 42b between narrower slots 42a, 42c on either side.

A rocker mount 46 fastens to the mounting flange 36. In other embodiments, the rocker mount 44 fastens directly to the chassis 14. However, the mounting flange 36 may provide a mounting point that is lower in order to properly position the rocker mount 44. The rocker mount 44 may be sized to fit within a recess defined by the rim 40 of the mounting flange 36. The rocker mount 44 may fasten to the mounting flange 36 by means of fasteners passing through the slots 42a-42c. In this manner, the rocker mount 44 may be secured to the chassis 14 at various positions along the vertical direction 12b in order to adjust the tension in a track. Other alternative means of vertical adjustment are provided rather than slots, including, for example, multiple holes, or reversible plugs having offset holes, the plugs being placed within slots in various configurations changing the vertical positioning of the rocker mount 44 relative to the axle 30 and the drive wheel 32.

A rocker axle 46 is mounted to the rocker mount 44. In some embodiments, the rocker axle 46 is aligned with slot 42b such that a fastener securing the rocker mount 44 to the mounting flange 36 passes through the rocker axle 46.

A rocker 48 rotatably mounts on the rocker axle 46. For example, the rocker 48 may define an aperture 50 (visible in FIG. 3) that receives the rocker axle 46. A plurality of axles 52 protrudes outwardly from the rocker 48. One or more bogie wheels 54 rotatably mount to each axle 52. In the illustrated embodiment, two bogie wheels 54 are mounted to each axle 52. Each bogie wheel may include a bearing, e.g. cartridge bearing, interposed between each wheel 54 and the axle 52 to which it mounts. In some embodiments, a spacer 58 (see FIGS. 2A-2C) defines apertures 60 for receiving each axle 52 and the spacer 58 mounts to the axle between the pairs of bogie wheels mounted to each axle.

The track 62 wraps around the drive wheel 32 and bogie wheels 54 and is sized such that it is sufficiently tensioned.

Tension adjustment may also be accomplished with the adjustment of rocker mount 44 within slots 42. In the embodiment of FIG. 2A, there are three pairs of bogie wheels 54. The pairs of bogie wheels 54 are arranged such that a forward-most pair of bogie wheels 54 are offset from the axle 30 along the longitudinal direction 12a by a smaller amount than a rearward-most pair of bogie wheels 54. In the embodiment of FIG. 2B, the forward and rearward pairs of bogie wheels 54 are offset from the axle 30 along the longitudinal direction 12a by substantially equal amounts, e.g. within +/−2%. As discussed below in connection with FIG. 3, the bogie wheels may also be symmetrical about the axle 30.

Referring specifically to FIG. 2C, in some embodiments, a crossbar 64 spans between the mounting flanges 36 on either side of the chassis 14. In the illustrated embodiment, the crossbar includes flanges 66 on either end that include slots 68 corresponding in position to the slots 42a, 42c on the mounting flange 36. Accordingly, the same fasteners securing the rocker mount 44 to the mounting flange 36 may also fasten one of the flanges 66 to the mounting flange 36.

Figure 3:
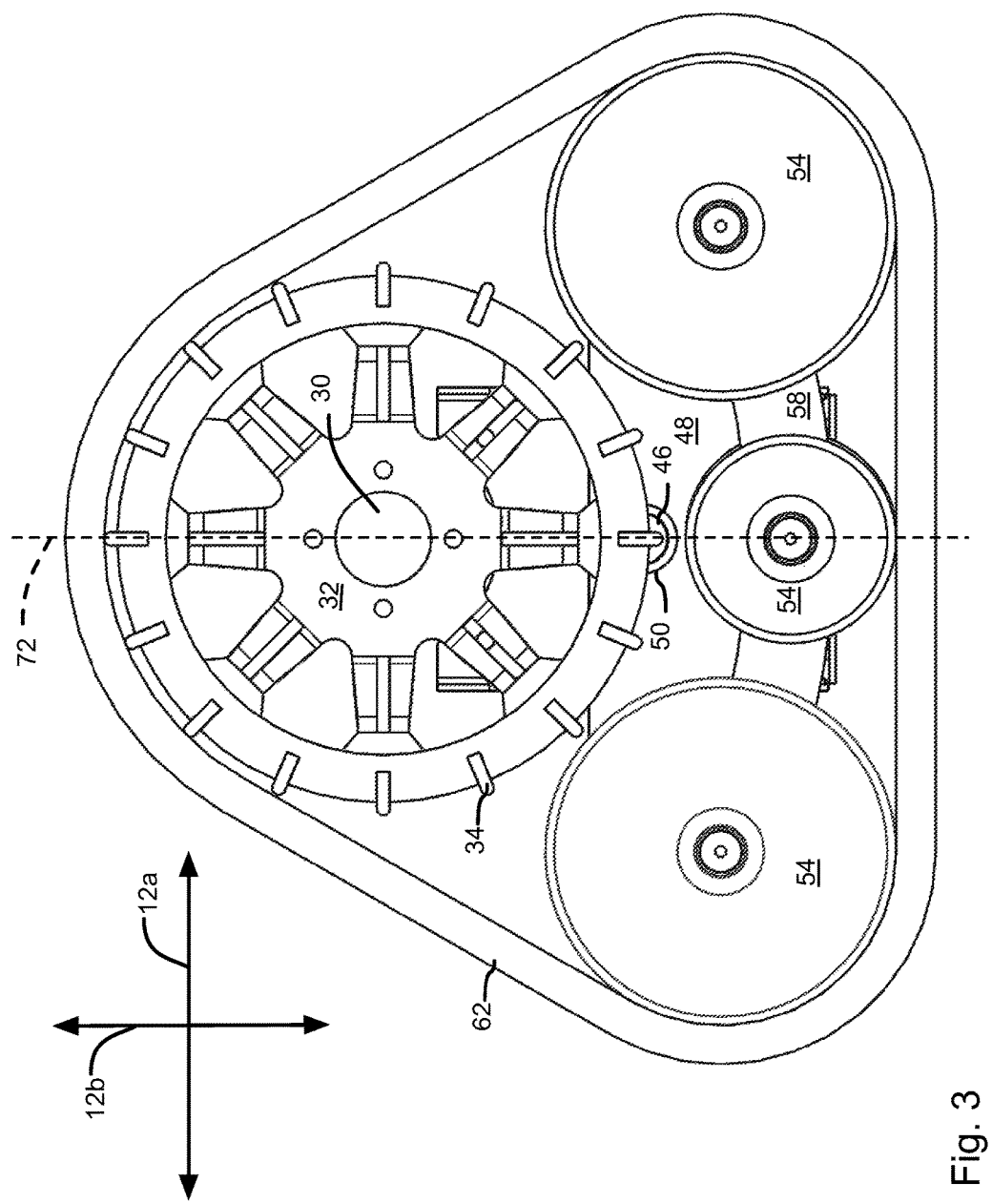
FIG. 3 is a side-elevational view of the track assembly in accordance with an embodiment of the present invention.

Referring to FIG. 3, in the illustrated embodiment, the bogie wheels 54 and rocker 48 are substantially centered on a vertical line 72 passing through a center of the axle 30, e.g. within 0.5 inches of centered. In the illustrated embodiment, a center pair of bogie wheels 54 are also substantially centered on line 72. Alternatively, as shown in FIG. 2A, the two rearward-most bogie wheels 54 are shifted slightly rearwardly of the center of the axle 30.

As is also apparent in FIG. 3, there is no structural component coupling the drive wheel 32 to the rocker 48, spacer 58, and bogie wheels 54, other than the coupling of the axle 30 to the chassis 14. Accordingly, all weight is born by the bogie wheels due to their mounting to the chassis 14 and no weight is transferred to the axle 30 by the drive wheel 32, other than its own weight and the track tension. Accordingly, stress on the axle 30 and transmission components driving the axle 30 is reduced.

In some embodiments, there is further no suspension, e.g. spring and/or damping component, coupling the bogie wheels 54 to the chassis 14. Specifically, the rocker 58 is rigidly coupled to the chassis such that only rotation is permitted.

Figure 4A:
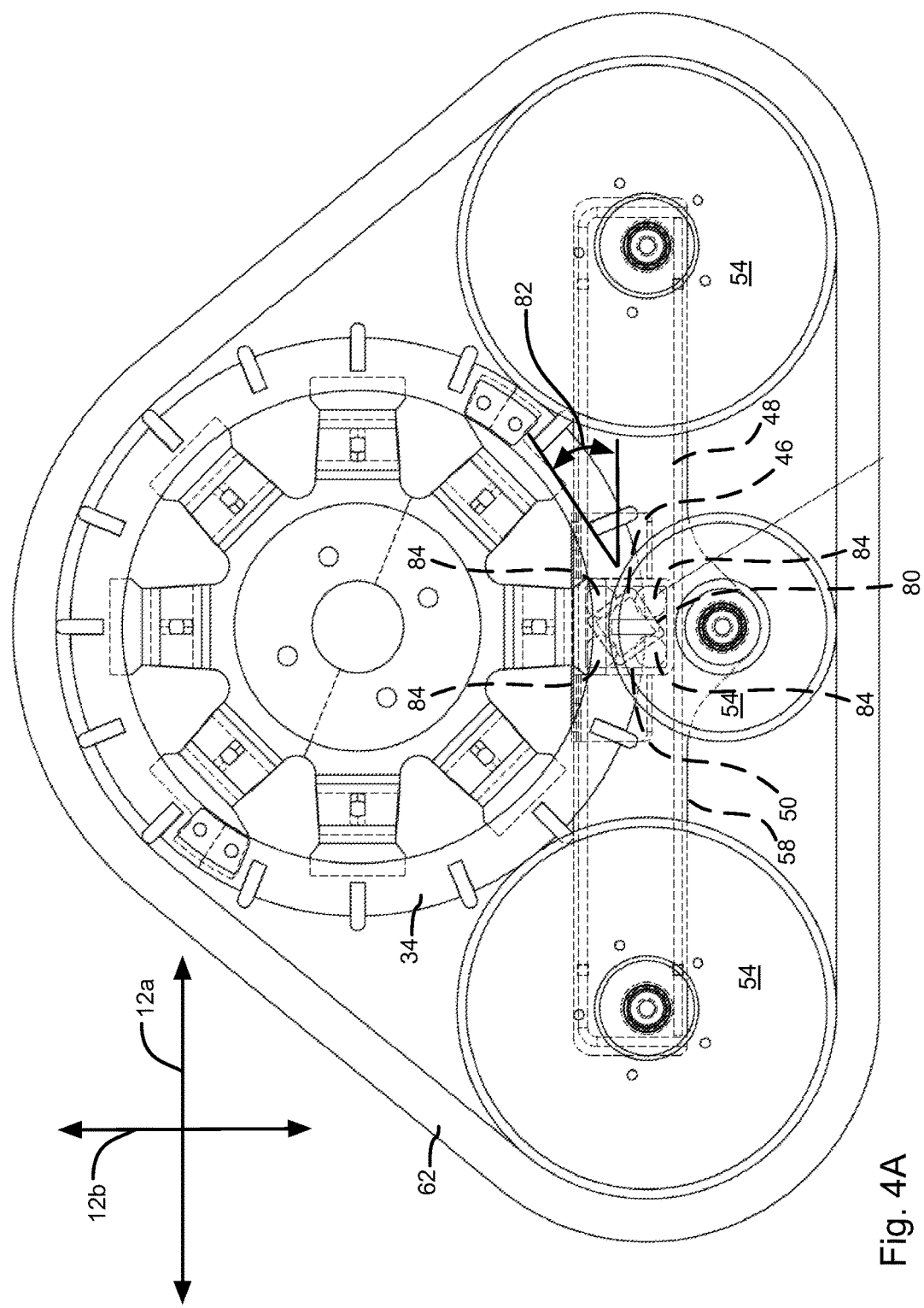
FIG. 4A is a side-elevational view of the track assembly incorporating a suspension in accordance with an embodiment of the present invention.

Referring to FIG. 4A, in some embodiments, a suspension component may be interposed between the track 62 and the chassis 14. For example, in one embodiment, the rocker axle 46 may be square (in cross-section) and the aperture 50 for receiving the rocker aperture may also be square. As is apparent in FIG. 4, the axle 46 fastens to the chassis 14, such as to mounting flange 36 (see FIG. 2A) at an angle. For example, a face 80 of the square rocker axle 46 may be at an angle 82 with respect to horizontal. The rocker axle 46 and aperture 50 are sized such that polymer rods 84 fit within the triangular regions between the axle 46 and the aperture 50. In this manner, rotation of the axle 46 relative to the aperture 50 results in deformation of the rods thereby providing a restoring force. The rods may have a hardness of between 40 and 100 shore scale, preferably between 60 and 85 Shore scale, in order to perform this function. Other elastomeric members may be used in place of polymer rods 84.

The angle 82 may be selected such that the rearmost bogie wheel 54 is biased downward. For example, for an angle 82 equal to 45 degrees, the polymer rods 82 do not invoke rotation of the rocker 48 when the mower 10 is positioned on a level surface. For an angle 82 that is less than 45 degrees, the weight of the mower will be shifted back onto the rearmost bogie wheel 54 when positioned on a level surface. This advantageously resists a tendency of the mower 10 to tip backward when driving up an incline. The angle 82 is preferably 45 degrees in which the bias is neutral, but may alternatively be set with a preload, such as within a preferred range of 25 to 65 degrees. The angle is preferably set or adjusted for different attachments that may be utilized with the vehicle on either the front of the vehicle or the rear of the vehicle. Such attachments bias the weight of the vehicle one direction or the other making the preferred offset of the angle from flat vary as the added weight is either ahead or behind the pivot point.

In the illustrated embodiment, the aperture 50 is defined by the rocker and the rocker axle 46 is mounted to the chassis 14. However, in other embodiments, the aperture 50 is defined by the chassis or a mounting structure fastened to the chassis 14 and the rocker axle 46 is fastened to the rocker 48. Likewise, the biasing downward of the rearmost bogie wheel 54 may be accomplished by adjusting the orientation of the axle 46 and/or by adjusting the orientation of the aperture 50.

Figure 4C:
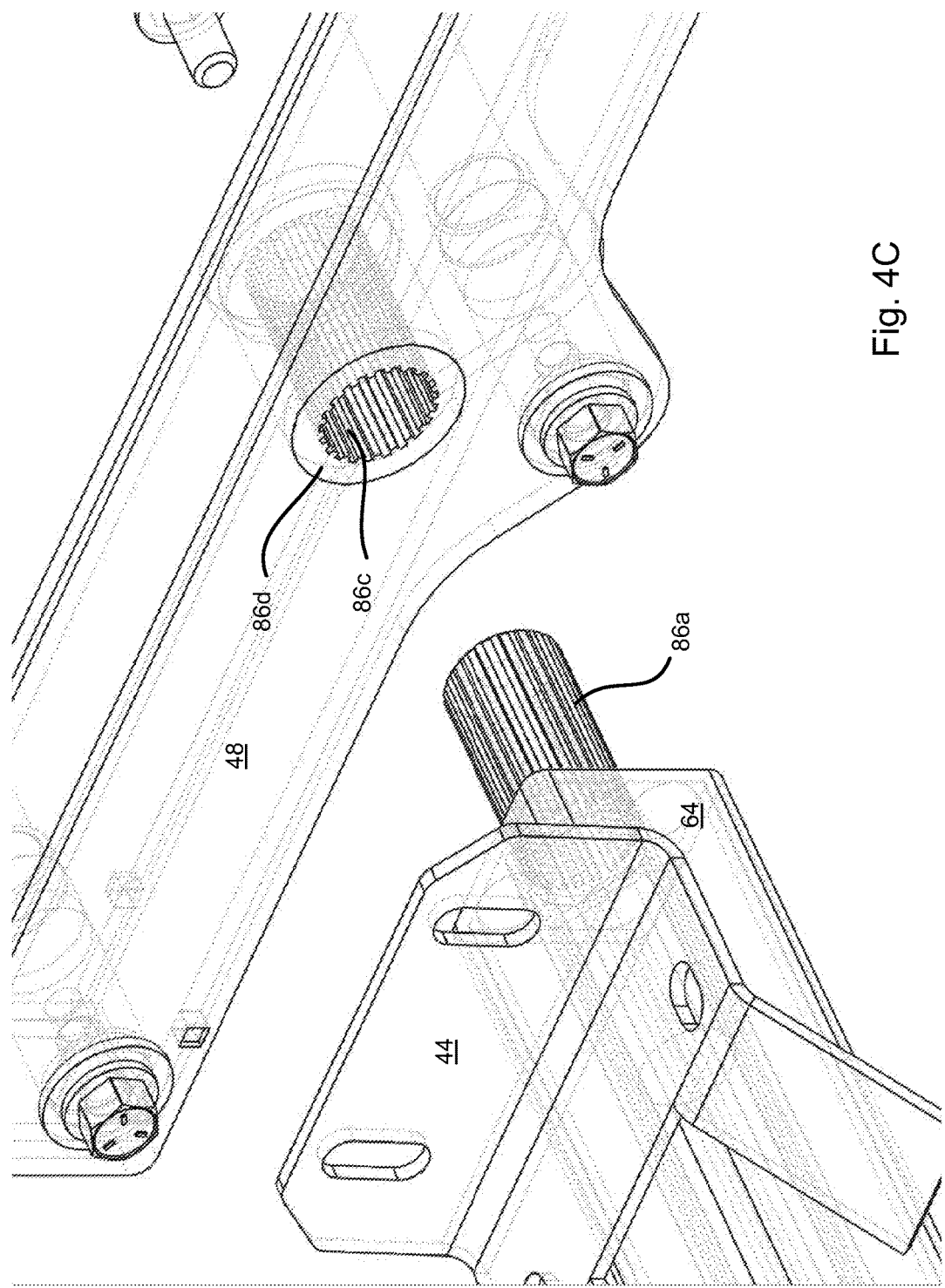
FIG. 4C is another view of the adjustable attachment of FIG. 4B.

Referring to FIGS. 4B and 4C, in some embodiments, the polymer rods 84 seat within the cross beam 64 that is welded or otherwise fastened to the rocker mount 44. Alternatively, the function of the cross beam 64 in the embodiment of FIGS. 4B and 4C may be performed by a square tube that does not span across the mower 10 and therefore does not function as a cross beam 64. A splined shaft 86a is fastened to an axle 86b that inserts into the cross beam 64 such that the polymer rods 84 are positioned between faces of the axle 86b and interior faces of the cross beam 64. In the illustrated embodiment, the axle 86b is a square axle providing four faces engaging the four polymer rods 84. In the illustrated embodiment, absent a load, the faces of the axle 86b are at a 45-degree angle with respect to the interior faces of the cross beam 64. The axle 86b may span across the chassis and secure to the splined shafts 86a of the track assembly 20 on the opposite side of the mower 10. Alternatively, the mower 10 may include separate axles 86b for the track assemblies 20 on opposite sides of the mower 10 such that the axles 86b of the track assemblies 20 are free to move relative to one another subject to the resistance of the polymer rods 84. Likewise, the cross beam 64 may be a single beam that spans between the track assemblies or may include separate square channels each receiving the axle 86b and polymer rods 84 of one track assembly, where the separate square channels do not connect to one another.

The splined shaft 86a inserts within a splined aperture 86c defined by the rocker 48. In the illustrated embodiment, the splined aperture 86c is defined by an insert 86d passing through the rocker 48. By adjusting the position of the rocker 48 with respect of the splined shaft 86a, the rocker 48 may be biased at any arbitrary angle in order to cause the polymer rods 84 to exert a desired amount of restoring force on the rearmost or forwardmost bogie wheel 54. As shown in FIG. 4B, a cap 86e may be positioned over one end of the splined aperture 86c and define an opening 86f for receiving a fastener 86g engaging the splined shaft 86a and preventing removal of the splined shaft 86a from the splined aperture 86c.

Referring to FIG. 5, in some embodiments, the bogie wheels 54 include bogie wheels 54b-54f that are distributed along the longitudinal direction 12a such that the front wheels 18 may be eliminated, e.g. both in front of and behind the center of gravity of the mower 10.

In such embodiments, two rockers 48a, 48b may rotatably mount to the chassis 14, such as in the same manner as the rocker 48 of embodiments of FIGS. 1 to 3. In particular, a rocker mount 44 may secure to the chassis 14 and define a rocker axle 46 that passes through aperture 50 in the rocker 48a, 48b. Likewise, a cross beam 64 may secure the rocker mounts 44 on opposite sides of the vehicle such as in the same manner as shown in FIG. 2C.

In the illustrated embodiment, at least two bogie wheels rotatably secure to each rocker 48a, 48b, such as in the same manner as for the embodiments of FIGS. 1 to 3. In the illustrated embodiment at least the two forward-most bogie wheels 54a, 54b and at least the two rearward-most bogie wheels 54f, 54g are rotatably mounted to the rockers 48a, 48b, respectively.

In some embodiments, one or more of the middle bogie wheels 54c-54e are mounted to a separate frame 88. The frame 88 may be mounted directly to the chassis 14 or pivotally mounted to the rockers 48a, 48b. In the illustrated embodiment, the frame 88 is pivotally mounted to the rockers 48a, 48b by means of one or more links 90 such that the frame 88 is permitted to move up and down relative to the rockers 48a, 48b. For example, the links 90 may implement a scissor linkage between the frame 88 and the rockers 48a, 48b. In such an embodiment, at least one of links 90 may be both slidably and rotatably mounted to at least one of the frame 88 and the rockers 48a, 48b.

Figure 6:
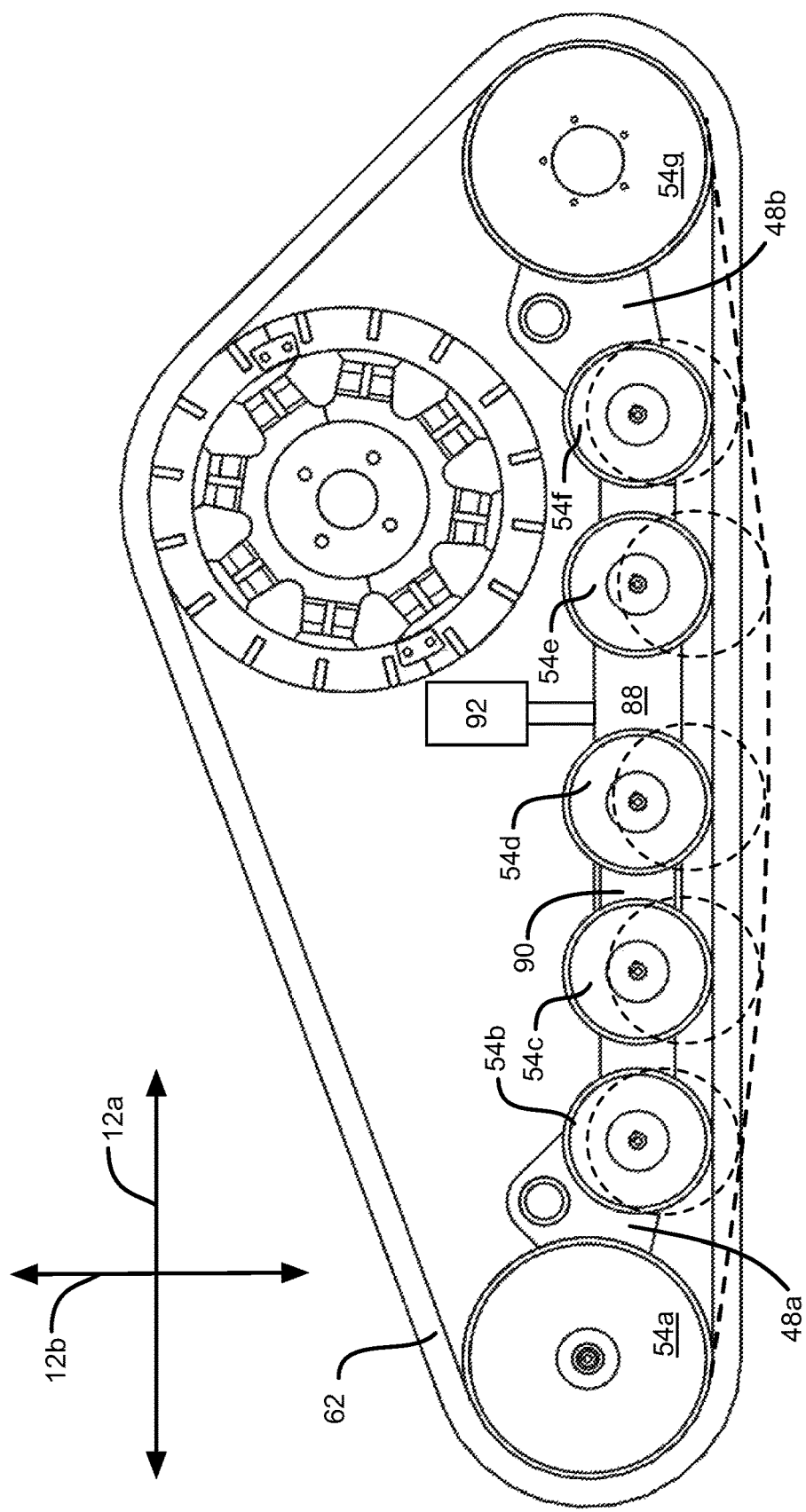
FIG. 6 is a side-elevational view of the track assembly of FIG. 5.

Referring to FIG. 6, in some embodiments, the frame 88 is mounted to one or more hydraulic actuators 92. The actuators 92 raise and lower the frame 88. For a zero turn mower, it may be advantageous for the contact patch of the track 62 to be reduced when turning to avoid damage to a lawn and reduce strain on drive train components. Accordingly, when turning the actuators 92 may push the frame 88 downward as shown by the dotted representation, thereby reducing the contact patch of the track 62, or at least decreasing the pressure at one or both ends of the track such that the track can be more easily rotated about a vertical axis when turning the vehicle.

As shown in FIG. 5, a driveline 102 of a vehicle such as the mower 10 may include components such as a transmission or hydraulic motors 104 and the axle 30. Accordingly, the drive wheel 32 is typically mounted to the driveline 102, and the bogie wheel assembly is decoupled from the driveline 102 and mounted to the chassis 14 independently of the driveline 102. As shown in FIGS. 2A and 2B, a pivotal coupling (for example, the rocker mount 44, the rocker axle 46, or the rocker 48) preferably pivotally couples the bogie wheel assembly to a fixed member (for example, the mounting flange 36 or the longitudinally extending chassis beam) of the chassis 14. As shown in FIGS. 2A-2C, the track assemblies 20 preferably each include a mounting plate (for example, the mounting flange 36) fastened to the chassis 14, with the bogie wheel assembly being pivotally mounted to the mounting plate and with the vehicle including a bar (for example, the crossbar 64) position below the chassis 14 and rigidly coupling the mounting plates to one another. As shown in FIGS. 2A, 2B, and 4B, a biasing member (for example, portions of the suspension component such as the rocker axle 46 or axle 86b and the polymer rods) is typically disposed between the bogie wheel assembly and the chassis 14, with the biasing member resisting rotation of the bogie wheel assembly about the pivotal coupling. As shown in FIG. 5, the transmission or hydraulic motors 104 preferably couples the engine 24 to the axles 30, and the transmission or hydraulic motors 104 preferably implement a zero-turn radius drive system.

While preferred embodiments of the invention have been illustrated and described, as noted above, many changes can The embodiments of the invention in which an exclusive property or privilege is claimed are defined as follows:

1. A vehicle comprising:
   a chassis;
   an engine mounted to the chassis;
   a driveline coupled to the engine; and
   track assemblies positioned on either side of the chassis, each track assembly comprising:
      a drive wheel mounted to the driveline;
      a bogie wheel assembly decoupled from the driveline and mounted to the chassis independently of the driveline; and
      a track wrapped around the drive wheel and bogie wheel assembly;
   wherein the bogie wheel assembly supports all weight applied to the track such that vertical force applied to the bogie wheel assembly is transferred to the chassis through the bogie wheel assembly and entirely bypasses the driveline en route to the chassis.

2. The vehicle of claim 1, wherein the driveline includes an axle, and the bogie wheel assembly is located vertically below the axle.

3. The vehicle of claim 1, further comprising a pivotal coupling that pivotally couples the bogie wheel assembly to a fixed member of the chassis.

4. The vehicle of claim 3, wherein the track assemblies each further comprise a mounting plate fastened to the chassis, the bogie wheel assembly being pivotally mounted to the mounting plate, the vehicle further comprising a bar positioned below the chassis and rigidly coupling the mounting plates to one another.

5. The vehicle of claim 3, further comprising a biasing member between the bogie wheel assembly and the chassis, said biasing member resisting rotation of the bogie wheel assembly about the pivotal coupling.

6. The vehicle of claim 5, wherein the orientation of the pivotal coupling is adjustable such that a preload may be placed on the biasing member.

7. The vehicle of claim 1, wherein the bogie wheel assembly comprises a rocker having a plurality of bogie wheels rotatably mounted thereto, the rocker being rotatably mounted to the chassis without any intervening suspension component.

8. The vehicle of claim 1, wherein the driveline includes an axle, and the plurality of bogie wheels are symmetrically arranged with respect to the axle.

9. The vehicle of claim 1, wherein the driveline includes an axle, and a rearward most bogie wheel of the plurality of bogie wheels is positioned farther from the axle than a forward most bogie wheel of the plurality of bogie wheels.

10. The vehicle of claim 1, further comprising a mower deck mounted to the chassis forward of the track assemblies.

11. The vehicle of claim 10, further comprising two or more casters mounted to the chassis having the mower deck positioned between the casters and the track assemblies.

12. The vehicle of claim 11, further comprising a transmission, wherein the driveline includes axles coupled to the track assemblies, and the transmission couples the engine to the axles, the transmission implementing a zero-turn radius drive system.

13. A method comprising:
   providing a vehicle including a chassis, an engine mounted to the chassis, and a driveline coupled to the engine; and
   mounting a track assembly to the vehicle by—
      mounting a drive wheel to the driveline;
      mounting a bogie wheel assembly to the chassis independently of the driveline such that the bogie wheel assembly is rigidly and rotatably mounted to the chassis and decoupled from the driveline; and
      placing a track around the drive wheel and bogie wheel assembly; and
   resting the vehicle on the bogie wheel assembly such that all weight applied to the track is supported by the bogie wheel assembly and vertical force applied to the bogie wheel assembly is transferred to the chassis through the bogie wheel assembly and entirely bypasses the driveline en route to the chassis.

14. The method of claim 13, wherein the driveline includes an axle, and mounting the bogie wheel assembly to the chassis comprises mounting the bogie wheel vertically below the axle.

15. The method of claim 13, wherein mounting the bogie wheel assembly to the chassis comprises inserting a square axle into a square aperture having a plurality of resilient members interposed between the square axle and square aperture, the square axle being mounted to one of the bogie wheel assembly and the chassis and the square aperture being defined by the other of the bogie wheel assembly and chassis;
   wherein the track assembly is a first track assembly, the method further comprising securing a second track assembly to the chassis;
   wherein the square axle is at least one of (a) a single square axle spanning the chassis and coupled to both the first track assembly and the second track assembly and (b) one square axle of a pair of square axles, each square axle of the pair coupled to one track assembly of the first and second track assemblies.

16. The method of claim 15, wherein the track assembly is a first track assembly and the driveline includes a first axle, the method further comprising:
   providing a second track assembly and a second axle of the driveline, the second axle mounted to the chassis and operably coupled to the engine;
   rigidly mounting a bar to the chassis spanning across the chassis between the first and second axles and located vertically below the first and second axles; and
   mounting the bogie wheel assembly of the first track assembly to a first end of the bar and mounting the bogie wheel assembly of the second track assembly to a second end of the bar.

17. The method of claim 13, wherein the bogie wheel assembly comprises a rocker having a plurality of bogie wheels rotatably mounted thereto, the rocker being rotatably mounted to the chassis without any intervening suspension component.

18. The method of claim 13, further comprising mounting a mower deck to the chassis forward of the track assemblies.

19. The method of claim 13, further comprising removing a wheel from an axle of the driveline prior to mounting the track assembly to the vehicle.

* * * * *